United States Patent [19]

Togane

[11] Patent Number: 4,985,167

[45] Date of Patent: Jan. 15, 1991

[54] LOW-LOSS OXIDE MAGNETIC MATERIAL

[75] Inventor: Hikohiro Togane, Sagamihara, Japan

[73] Assignee: Mitsubishi Denki Kabushiki Kaisha, Tokyo, Japan

[21] Appl. No.: 381,302

[22] Filed: Jul. 18, 1989

[30] Foreign Application Priority Data

Jul. 18, 1988 [JP] Japan .................................. 63-178718
Aug. 19, 1988 [JP] Japan .................................. 63-205990

[51] Int. Cl.$^5$ ............................................. C04B 35/38
[52] U.S. Cl. ............................... 252/62.58; 252/62.59; 252/62.62; 252/62.63
[58] Field of Search ................ 252/62.58, 62.59, 62.62, 252/62.63

[56] References Cited

U.S. PATENT DOCUMENTS

| | | | |
|---|---|---|---|
| 2,962,444 | 11/1960 | Guillaud et al. | 252/62.62 |
| 2,977,311 | 3/1961 | Guillaud et al. | 252/62.62 |
| 3,106,534 | 10/1963 | Akashi et al. | 252/62.62 |
| 3,837,910 | 9/1974 | Van der Laan et al. | 252/62.62 |

FOREIGN PATENT DOCUMENTS

| | | | |
|---|---|---|---|
| 63-116406 | 5/1988 | Japan | 252/62.62 |
| 923991 | 4/1963 | United Kingdom . | |
| 1239813 | 7/1971 | United Kingdom . | |
| 1254388 | 7/1971 | United Kingdom . | |

*Primary Examiner*—Jack Cooper
*Attorney, Agent, or Firm*—Oblon, Spivak, McClelland, Maier & Neustadt

[57] ABSTRACT

A low-loss oxide magnetic material consists of a Mn-Zn type ferrite which contains P, Al or Cr as well as SiO$_2$ and CaO as sub-components. This magnetic material makes it possible to reduce the loss of electrical power under high-frequency or high-load conditions to a remarkable extent.

3 Claims, No Drawings

4,985,167

LOW-LOSS OXIDE MAGNETIC MATERIAL

BACKGROUND OF THE INVENTION

1. Field of the Invention

This invention relates to a low-loss oxide magnetic material consisting of a Mn-Zn type ferrite which is suitable for use as a magnetic core for an electrical power source in a display monitor or similar device.

2. Description of the Related Art

As this type of ferrite for an electrical power source, a Mn-Zn type ferrite is heretofore known that was proposed by the present applicant in Japanese Patent Publication No. 53-28634. This Mn-Zn type ferrite is of the type in which CaO, $SiO_2$, Cl and $SnF_2$ are added in order to reduce the loss of electrical power.

In recent years, a demand has arisen for higher resolutions of display monitors and similar devices and for larger screen sizes of color television sets intended for general consumers. In response to this demand, in the field of electrical power sources used in these display monitors and color television sets, the operating frequency and the level of load have been made higher and higher.

However, the conventional Mn-Zn type ferrite involves the problems that the loss of electrical power is large; that material temperature rises in an electrical power source result; and that a serious reduction in reliability results.

SUMMARY OF THE INVENTION

It is, therefore, an object of the present invention to provide a low-loss oxide magnetic material consisting of a low-loss Mn-Zn type ferrite whose loss of electrical power under high-frequency or high-load conditions is reduced to a remarkable extent.

To achieve the above object, according to one aspect of the present invention, there is provided a low-loss oxide magnetic material comprising: main components including 52–56 mol% of $Fe_2O_3$, 32–42 mol% of MnO and 5–15 mol% of ZnO; and sub-components including 10–70 ppm of P, 100–300 ppm of $SiO_2$ and 200–2,000 ppm of CaO.

According to another aspect of the present invention, there is provided a low-loss oxide magnetic material comprising: main components including 52–56 mol% of $Fe_2O_3$, 32–42 mol% of MnO and 5–15 mol% of ZnO; and sub-components including 10–130 ppm of Al, 100–300 ppm of $SiO_2$ and 200–2,000 ppm of CaO.

According to still another aspect of the present invention, there is provided a low-loss oxide magnetic material comprising: main components including 52–56 mol% of $Fe_2O_3$, 32–42 mol% of MnO and 5–15 mol% of ZnO; and sub-components including 10–100 ppm of Cr, 100–300 ppm of $SiO_2$ and 200–2,000 ppm of CaO.

DESCRIPTION OF THE PREFERRED EMBODIMENT

A method of manufacturing low-loss oxide magnetic materials in accordance with the present invention comprises the steps of mixing the materials that are the main components, calcinating the mixture, finely dividing the calcinated mixture to prepare ferrite powder, mixing the materials that are sub-components with the ferrite powder, adding a binder such as polyvinyl alcohol or the like to the mixture, granulating and shaping the mixture, and sintering the shaped product. The main materials and the sub-materials may respectively be selected from among the above-described oxides, or salts or other compounds which can be formed into the aforesaid oxides by sintering.

The use of a magnetic material according to the present invention enables the loss of electrical power to be reduced to a remarkable extent and enables satisfactory low-loss characteristics to be realized even in a frequency region of 130 kHz or thereabouts. If such a magnetic material is used for a magnetic core in a transformer, the generation of heat occurs when the transformer is in operation. However, the magnetic material according to the present invention can be formed so that the loss of electrical power becomes the lowest in a temperature range of from about 60° C. to about 100° C. Accordingly, it is possible to reduce the loss of electrical power during actual operation.

Examples of the present invention and Comparative Examples will be explained below.

EXAMPLE 1

A material which consisted essentially of 53.5 mol% of $Fe_2O_3$, 38.5 mol% of MnO and 8.0 mol% of ZnO was calcinated and finely divided to prepare ferrite powder. Then, 94 ppm of $Al_2O_3$ (containing 50 ppm of Al), 200 ppm of $SiO_2$, and 1,640 ppm of $CaCO_3$ (containing 1,000 ppm of CaO) were added as sub-components to, and mixed with, this ferrite powder. A solution of polyvinyl alcohol as a binder was then added to the mixture, and granulation was conducted. The granulated mixture was formed into a ring-shaped sample having a 60 mm outer diameter, a 40 mm inner diameter, and a 10 mm height under a forming pressure of 1 ton/$cm^2$. In this case, the composition of components initially contained in the material was analyzed to obtain the contents of the respective components, and the amount of each of the additives was reduced by an amount equivalent to the content of its corresponding component. In this manner, the total amount added was adjusted so that the amounts of respective additives assumed the values in the corresponding parentheses. The sample thus obtained was completely calcined at 1,350° C. for 2 hours in an oven with a $N_2$ atmosphere whose oxygen concentration was controlled.

When the loss of electrical power in this sample was measured under the measurement conditions of a frequency of 25 kHz, a magnetic flux density of 2,000 Gauss and a temperature of 100° C., it was found to be 65 mW/$cm^3$. The waveform obtained at this time was that of a sine curve. When an initial permeability $\mu i$ was measured under the conditions of 10 kHz, 10 T and 10 mA, it was found to be 1,880.

EXAMPLES 2 TO 12, COMPARATIVE EXAMPLES 1 TO 3

Examples 2 to 12 and comparative examples 1 to 3, each of which consisted essentially of the same components as Example 1, were prepared in accordance with the same procedure as that used in Example 1, but the composition of sub-components was altered as shown in Table 1. The loss of electrical power and the initial permeability $\mu i$ of each of these samples were measured. Table 1 shows the measurement results. In Table 1, the measurement conditions for the loss of electrical power and the initial permeability $\mu i$ were identical to those used in Example 1.

TABLE 1

| | Sub-component (ppm) | | | Initial permeability ($\mu i$) | Loss of electrical power (mW/cm$^3$) |
|---|---|---|---|---|---|
| | Al | SiO$_2$ | CaO | | |
| Example 1 | 50 | 200 | 1000 | 1880 | 65 |
| Comparative Example 1 | 0 | 200 | 1000 | 1750 | 90 |
| Example 2 | 10 | 200 | 1000 | 1800 | 85 |
| Example 3 | 30 | 200 | 1000 | 1830 | 76 |
| Example 4 | 80 | 200 | 1000 | 1850 | 67 |
| Example 5 | 100 | 200 | 1000 | 1850 | 69 |
| Example 6 | 130 | 200 | 1000 | 1740 | 82 |
| Comparative Example 2 | 160 | 200 | 1000 | 1720 | 108 |
| Comparative Example 3 | 210 | 200 | 1000 | 1700 | 135 |
| Example 7 | 50 | 200 | 200 | 1730 | 110 |
| Example 8 | 50 | 200 | 500 | 1780 | 77 |
| Example 9 | 50 | 200 | 2000 | 1810 | 70 |
| Example 10 | 50 | 100 | 1000 | 1750 | 100 |
| Example 11 | 50 | 250 | 1000 | 1820 | 73 |
| Example 12 | 50 | 300 | 1000 | 1840 | 72 |

It is apparent from the results shown in Table 1 that, if Al, SiO$_2$, and CaO are added in a compounded form, the loss of electrical power can be reduced to a great extent, whereby a low-loss oxide magnetic material can be obtained. However, in a case where the content of Al, which is one of the sub-components, is less than 10 ppm or greater than 100 ppm, the loss of electrical power becomes excessively large. Accordingly, it is unsuitable to set the content of Al to such a weight ratio.

If the content of SiO$_2$, which is another sub-component, is less than 100 ppm or greater than 300 ppm, the electrical resistance becomes less and the loss of electrical power greater. Accordingly, it is unsuitable to set the content of SiO$_2$ to such a weight ratio.

If the content of CaO is greater than 2,000 ppm, the resultant grain size decreases but the loss of electrical power becomes large since hysteresis losses increase. If the content of CaO is less than 200 ppm, the grain boundary layer becomes thin and eddy current losses increase. Accordingly, it is unsuitable to set the content of CaO to such a weight ratio.

In the present invention, the above-described components need to be added prior to the calcining step; the addition may be conducted by any process.

EXAMPLES 13 TO 24, COMPARATIVE EXAMPLES 4 TO 6

Examples 13 to 24 and comparative examples 4 to 6, each of which consisted essentially of the same components as Example 1, were prepared in accordance with the same procedure as that used in Example 1, but, as one sub-component, Cr$_2$O$_3$ was used in place of Al$_2$O$_3$ and the composition of sub-components was altered as shown in Table 2. The loss of electrical power and the initial permeability $\mu i$ of each of these samples were measured. Table 2 shows the measurement results. In Table 2, the measurement conditions for the loss of electrical power and the initial permeability $\mu i$ were identical to those used in Example 1.

TABLE 2

| | Sub-component (ppm) | | | Initial permeability ($\mu i$) | Loss of electrical power (mW/cm$^3$) |
|---|---|---|---|---|---|
| | Cr | SiO$_2$ | CaO | | |
| Example 13 | 60 | 200 | 1000 | 1900 | 58 |
| Comparative Example 4 | 0 | 200 | 1000 | 1750 | 90 |
| Example 14 | 10 | 200 | 1000 | 1840 | 80 |
| Example 15 | 30 | 200 | 1000 | 1870 | 66 |
| Example 16 | 50 | 200 | 1000 | 1880 | 60 |
| Example 17 | 80 | 200 | 1000 | 1860 | 65 |
| Example 18 | 100 | 200 | 1000 | 1810 | 84 |
| Comparative Example 5 | 150 | 200 | 1000 | 1740 | 132 |
| Comparative Example 6 | 200 | 200 | 1000 | 1650 | 155 |
| Example 19 | 60 | 200 | 200 | 1710 | 101 |
| Example 20 | 60 | 200 | 500 | 1780 | 72 |
| Example 21 | 60 | 200 | 2000 | 1880 | 65 |
| Example 22 | 60 | 100 | 1000 | 1840 | 95 |
| Example 23 | 60 | 250 | 1000 | 1830 | 70 |
| Example 24 | 60 | 300 | 1000 | 1860 | 68 |

It is apparent from the results shown in Table 2 that, if Cr, SiO$_2$ and CaO are added in a compounded form, the loss of electrical power can be reduced to a great extent, whereby a low-loss oxide magnetic material can be obtained. However, if the content of Cr, which is one of the sub-components, is less than 10 ppm, the resultant grain size becomes excessively small, while, if the content of Cr is greater than 100 ppm, the grain size becomes excessively large. Accordingly, since the loss of electrical power becomes excessively large in either case, it is unsuitable to set the content of Cr to such a weight ratio.

If the content of SiO$_2$, which is another sub-component, is less than 100 ppm or greater than 300 ppm, the loss of electrical power increases. Accordingly, it is unsuitable to set the content of SiO$_2$ to such a weight ratio.

If the content of CaO is greater than 2,000 ppm, the resultant grain size is made small, but the loss of electrical power becomes large since hysteresis losses become greater. If the content of CaO is less than 200 ppm, the grain boundary layer becomes thin and eddy current losses increase. Accordingly, it is unsuitable to set the content of CaO to such a weight ratio.

In the present invention, the above-described components need to be added prior to the calcining step; the addition may be conducted by any process.

EXAMPLES 25 TO 34, COMPARATIVE EXAMPLES 7 TO 9

A material which consisted essentially of 53.5 mol% of Fe$_2$O$_3$, 38.5 mol% of MnO and 8.0 mol% of ZnO was calcinated and finely divided to prepare ferrite powder. Then, 79 ppm of H$_3$PO$_4$ (containing 30 ppm of P), 200 ppm of SiO$_2$, and 1,640 ppm of CaCO$_3$ (containing 1,000 ppm of CaO) were added as sub-components to, and mixed with, this ferrite powder. A solution of polyvinyl alcohol as a binder was then added to the mixture, and granulation was conducted. The granulated mixture was formed into a ring-shaped sample having a 60 mm outer diameter, a 40 mm inner diameter, and a 10 mm height under a forming pressure of 1 ton/cm$^2$. In this case, the composition of components initially contained in the material was analyzed to obtain the contents of the respective components, and the amount of each of the additives was reduced by an amount equivalent to the content of its corresponding component. In this manner, the total amount added was adjusted so that the amounts of respective additives assumed the values in the corresponding parentheses. The sample thus obtained was completely calcined at 1,350° C. for 2 hours in an oven with a $N_2$ atmosphere whose oxygen concentration was controlled.

When the loss of electrical power in this sample was measured under the measurement conditions of a frequency of 25 kHz, a magnetic flux density of 2,000 Gauss and a temperature of 100° C., it was found to be 60 mW/cm$^3$. The waveform obtained at this time was that of a sine curve. When the initial permeability $\mu i$ was measured under the conditions of 10 kHz, 10 T and 10 mA, it was found to be 1,880.

Moreover, examples 25 to 34 and comparative examples 7 to 9, each of which consisted essentially of the same components as Example 1, were prepared in accordance with the same procedure as that described above, but the composition of sub-components was altered as shown in Table 3. The loss of electrical power and the initial permeability $\mu i$ of each of these samples were measured. Table 3 shows the measurement results. In Table 3, the measurement conditions for the loss of electrical power and the initial permeability $\mu i$ were identical to those used in Example 1.

TABLE 3

|  | Sub-component (ppm) | | | Initial permeability ($\mu i$) | Loss of electrical power (mW/cm$^3$) |
| --- | --- | --- | --- | --- | --- |
|  | P | SiO$_2$ | CaO |  |  |
| Example 25 | 30 | 200 | 1000 | 1883 | 60 |
| Example 26 | 10 | 200 | 1000 | 1840 | 72 |
| Example 27 | 50 | 200 | 1000 | 1890 | 65 |
| Example 28 | 70 | 200 | 1000 | 1835 | 70 |
| Example 29 | 30 | 200 | 200 | 1750 | 71 |
| Example 30 | 30 | 200 | 500 | 1820 | 63 |
| Example 31 | 30 | 200 | 2000 | 1950 | 70 |
| Example 32 | 30 | 100 | 1000 | 1710 | 80 |
| Example 33 | 30 | 250 | 1000 | 1805 | 77 |
| Example 34 | 30 | 300 | 1000 | 1930 | 100 |
| Comparative Example 7 | 0 | 200 | 1000 | 1750 | 90 |
| Comparative Example 8 | 100 | 200 | 1000 | 1760 | 81 |
| Comparative Example 9 | 150 | 200 | 1000 | 1700 | 103 |

It is apparent from the results shown in Table 3 that, if P, SiO$_2$ and CaO are added in a compounded form, the loss of electrical power can be reduced to a great extent, whereby a low-loss oxide magnetic material can be obtained.

However, if the content of P, which is one of the sub-components, is less than 10 ppm, the resultant grain size becomes excessively small, while, if the content of P is greater than 70 ppm, the grain size becomes excessively large. Accordingly, since the loss of electrical power becomes excessively large in either case, it is unsuitable to set the content of P to such a weight ratio.

If the content of SiO$_2$, which is another sub-component, is less than 100 ppm or greater than 300 ppm, the electric resistance decreases and the loss of electrical power increases. Accordingly, it is unsuitable to set the content of SiO$_2$ to such a weight ratio.

If the content of CaO is greater than 2,000 ppm, the resultant grain size is made small, but the loss of electrical power becomes large since hysteresis losses increase. If the content of CaO is less than 200 ppm, the grain boundary layer becomes thin and eddy current losses increase. Accordingly, it is unsuitable to set the content of CaO to such a weight ratio.

In the present invention, the above-described components need to be added prior to the calcining step; the addition may be conducted by any process.

What is claimed is:

1. A low-loss Mn-Zn ferrite magnetic material consisting essentially of:
   52–56 mol% of Fe$_2$O$_3$, 32–42 mol% of MnO and 5–15 mol% of ZnO,
   10–70 ppm of P, 100–300 ppm of SiO$_2$ and 200–2,000 ppm of CaO,
   and exhibiting a smaller loss of electrical power than said ferrite material as defined above but where P is less than 10 ppm or greater than 70 ppm.

2. A low-loss Mn-Zn ferrite magnetic material consisting essentially of:
   52–56 mol% of Fe$_2$O$_3$, 32–42 mol% of MnO and 5–15 mol% of ZnO,
   10–130 ppm of Al, 100–300 ppm of SiO$_2$ and 200–2,000 ppm of CaO,
   and exhibiting a smaller loss of electrical power than said ferrite material as defined above but where Al is less than 10 ppm or greater than 130 ppm.

3. A low-loss Mn-Zn ferrite magnetic material consisting essentially of:
   52–56 mol% of Fe$_2$O$_3$, 32–42 mol% of MnO and 5–15 mol% of ZnO,
   10–100 ppm of Cr, 100–300 ppm of SiO$_2$ and 200–2,000 ppm of CaO,
   and exhibiting a smaller loss of electrical power than said ferrite material as defined above but where Cr is less than 10 ppm or greater than 100 ppm.

* * * * *